(12) United States Patent
Lewis

(10) Patent No.: US 6,240,187 B1
(45) Date of Patent: *May 29, 2001

(54) KEY REPLACEMENT IN A PUBLIC KEY CRYPTOSYSTEM

(75) Inventor: Tony Lewis, Hayward, CA (US)

(73) Assignee: Visa International, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/021,235

(22) Filed: Feb. 10, 1998

Related U.S. Application Data (62) Division of application No. 08/605,427, filed on Feb. 22, 1996, now Pat. No. 5,761,306.

(51) Int. Cl.[7] .................................................. H04L 9/00
(52) U.S. Cl. ........................... 380/282; 380/285; 380/30; 705/71
(58) Field of Search .......................... 380/273, 277–279, 380/282, 285, 30; 705/71; 713/170

(56) References Cited

U.S. PATENT DOCUMENTS

| | | | |
|---|---|---|---|
| 4,405,829 | 9/1983 | Rivest et al. | 380/30 |
| 4,453,074 | 6/1984 | Weinstein | 380/23 |
| 4,578,531 | 3/1986 | Everhart et al. | 380/21 |
| 4,688,250 | 8/1987 | Corrington et al. | 380/23 |
| 4,799,258 | 1/1989 | Davies | 380/21 |
| 4,850,018 | 7/1989 | Vogt | 380/23 |
| 4,926,478 | 5/1990 | Gruenberg | 380/21 |
| 4,972,472 | 11/1990 | Brown et al. | 380/21 |
| 4,993,067 | 2/1991 | Leopold | 380/21 |
| 5,046,125 | 9/1991 | Takizawa | 455/26.1 |
| 5,144,664 | 9/1992 | Esserman et al. | 380/20 |
| 5,164,988 | 11/1992 | Matyas et al. | 380/25 |
| 5,208,859 | 5/1993 | Bartucci et al. | 380/45 |
| 5,214,698 | 5/1993 | Smith, Sr. et al. | 380/21 |
| 5,265,164 | 11/1993 | Matyas et al. | 380/30 |
| 5,309,516 | 5/1994 | Takaragi et al. | 380/45 |
| 5,325,432 | 6/1994 | Gardeck et al. | 380/21 |
| 5,325,434 | 6/1994 | Spaanderman et al. | 380/45 |
| 5,365,225 | 11/1994 | Bachhuber | 340/825.31 |
| 5,465,206 | 11/1995 | Hilt et al. | 395/240 |
| 5,469,507 | 11/1995 | Canetti et al. | 380/30 |
| 5,499,294 | 3/1996 | Friedman | 380/10 |
| 5,506,905 | 4/1996 | Markowski et al. | 380/25 |
| 5,680,458 | * 10/1997 | Spelman et al. | 380/277 |
| 5,761,306 | * 6/1998 | Lewis | 380/282 |
| 5,956,407 | * 9/1999 | Slavin | 380/30 |
| 6,058,478 | * 5/2000 | Davis | 713/191 |

* cited by examiner

Primary Examiner—Tod Swann
Assistant Examiner—Steve Kabakoff
(74) Attorney, Agent, or Firm—Beyer Weaver & Thomas, LLP (57) ABSTRACT

Improved key management is provided by a public key replacement apparatus and method for operating over insecure networks. An active public key and the mask of a replacement public key are provided by a key server to nodes where the active key is used to encrypt and verify messages. To replace the active public key with the replacement public key, a key replacement message is sent to the node. The key replacement message contains the replacement public key and contains the mask of the next replacement key. The mask of the replacement public key may be generated by hashing or encrypting. The key replacement message is signed by the active public key and the replacement public key. Nodes are implemented by a computer, a smart card, a stored data card in combination with a publicly accessible node machine, or other apparatus for sending and/or receiving messages. In a particular application, a financial transaction network, nodes are consumer nodes, merchant nodes, or both, and transactions are securely sent over a possible insecure network

13 Claims, 7 Drawing Sheets

KEY REPLACEMENT IN A PUBLIC KEY CRYPTOSYSTEM

This application is a division of 08/605,427 Feb. 22, 1996 now U.S. Pat. No. 5,761,306.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyrights whatsoever.

1. Field of the Invention

The present invention relates to the field of secure transaction processing, more specifically to the field of public key encryption of transaction data.

2. Background Art

A cryptographic system is a system for sending a message from a sender to a receiver over a medium so that the message is "secure", that is, so that only the intended receiver can recover the message. A cryptographic system converts a message, referred to as "plaintext" into an encrypted format, known as "ciphertext." The encryption is accomplished by manipulating or transforming the message using a "cipher key" or keys. The receiver "decrypts" the message, that is, converts it from ciphertext to plaintext, by reversing the manipulation or transformation process using the cipher key or keys. So long as only the sender and receiver have knowledge of the cipher key, such an encrypted transmission is secure.

A "classical" cryptosystem is a cryptosystem in which the enciphering information can be used to determine the deciphering information. To provide security, a classical cryptosystem requires that the enciphering key be kept secret and provided to users of the system over secure channels. Secure channels, such as secret couriers, secure telephone transmission lines, or the like, are often impractical and expensive.

A system that eliminates the difficulties of exchanging a secure enciphering key is known as "public key encryption." U.S. Pat. No. 4,405,829 and Diffie and Hellman, "New Directions in Cryptography," IEEE Trans. Inform. Theory, vol. IT-22, pp. 644654, November 1976, teach public key encryption. With public key encryption, two keys are used, a private key and a public key. The keys are symmetrical, i.e., either key can be the public key or the private key—the labels "public" and "private" simply identify which key is made available to the public, and which key is kept private by the "owner" of the key pair. Public key encryption is applied to a "message". A message is text, graphics, data, or other digitized information, and public key encryption is used to either encrypt the message making it unreadable by anyone unless they have the private key or to create a readable message with a digital signature. A digital signature is created for a specific message using the private key. Only a person with knowledge of the private key is able to create a valid digital signature for a given message, so this prevents others from generating or altering messages and creating forged signatures.

To keep a message to the key owner private, the sender of the message will obtain the recipient's public key and use that key to encrypt the message. Before encryption, the message is said to be a "plain text" message (although the message might not be text at all) and following encryption, the message is said to be a "cipher text" message. The cipher text message can only be converted back to the original plain text message by a decryptor knowing the recipient's private key (the other key in the recipient's key pair). Of course, with enough computing power and a poorly chosen encryption scheme or key pair, a decryptor might be able to extract the plain text message without knowing the key. It is assumed here that a robust encryption scheme is selected such that the private key is indeed required.

A message is digitally "signed" by the key owner by applying a key and the message to a digital authenticator, which outputs a digital signature to be attached to the message. The recipient of the message can then apply the message, the digital signature and the key used to generate the signature to an authenticator which will indicate whether or not the digital signature was generated from that exact message and the key. With public key signatures, the private key is used to generate the digital signature and the public key is used to verify the signature.

In a transaction processing system, such as with the use of smart cards or terminals, a transaction is formed into a message and encrypted using the secret key of the operator of the transaction processing system. The term "smart card" refers to a card such as a bank card which contains data storage and computing ability, as opposed to a more conventional card, which contains only data storage, typically in the form of data stored on a magnetic stripe. A terminal might be an automatic teller machine (ATM), a terminal in a bank, a home personal computer, or other means for a user to send and receive data.

U.S. Pat. No. 4,972,472 issued to Brown et al. shows a method and apparatus for changing a master key in a cryptographic system. That system provides storage locations for three keys: a pending key, an active key and a retired key, When a key is to be replaced, the new key is stored in pending key location When a key update command is given, the existing active key is shifted to the retired key location and the pending key is shifted into the active key location. The retired key is used for applications which have not yet been made aware of the key change. Over time, applications are made aware of the change and shift over from using the retired key to using the active key.

One disadvantage of the Brown et al. system is that a replacement key could be sent by someone with unauthorized access to the channel used to transmit the keys. Thus, the key replacement apparatus is only useful where the channel in which the replacement keys are sent out is secure.

As should be apparent, anyone knowing the key owner's secret key can pose as the key owner, read the key owner's messages and create or alter messages sent in the name of the key owner. In an insecure system, unauthorized persons have the ability to view the traffic between the key server and the key users, whether or not such eavesdroppers know the secret keys being used. Once a secret key is compromised, it can no longer serve its purposes of making messages private.

One problem with a distributed system of smart cards or terminals is that they are widely distributed and when a secret key is compromised, it is impractical for all the holders of the smart cards or users of terminals to return to the central key authority to exchange keys or otherwise establish a clear channel to transmit the replacement key.

Another problem is the rapid and continual increase in computing power available. The impending obsolescence of DES (Data Encryption Standard—a secret key algorithm) is in part due to the subsequent developments in computing. At one time, a noted cryptologist calculated that a message encoded with DES could be decrypted without knowing the secret key in a month using $20 million in computer hardware. Recently, a group of noted cryptographers estimated that a $10 million investment in hardware would recover a DES key in 6 minutes (see "Minimal Key Lengths for Symmetric Ciphers to Provide Adequate Commercial Security" Blaze et al., A Report by an Ad Hoc Group of Cryptographers and Computer Scientists, January 1996, published at http://www.bsa.org/bsa/cryptologist.html). Thus, what is needed is a capability to increase security of keys as large amounts of raw computing power becomes more accessible to potential attackers.

SUMMARY OF THE INVENTION

Improved key management is provided by virtue of the present invention. The present invention provides an active public key and a "masked" replacement public key to nodes of a network. Herein "masked" or "the mask of" refers to any manner of securing the replacement key so that it is computationally difficult to determine the replacement key from its masked version. In one embodiment of the invention the masking of the replacement key is accomplished by hashing the replacement public key. An active public key and the hash of the replacement public key are provided by a key server to nodes of the network. Each time a key replacement is performed, the active public key is discarded, the replacement public key replaces the active public key, and the next replacement public key replaces the replacement public key. Thus, two public keys are recognizable at a node at any one time. These keys are network-wide keys and are used in addition to any node-specific key pairs.

Each node includes a system for sending and receiving messages to and from the network, such as a networked personal computer, a smart card, or a data card combined with a public terminal. Initially, each node is provided with the active public key and the hash of the replacement public key, along with any default node "owned" key pairs. The network-wide public keys have corresponding private keys which are owned by the operator of the network. The initial keying of the node is done over a secure channel between the node and the network operator. While other secure channels are possible, the simplest method is for the network operator to maintain control over some element of the node during the process of installing the initial public key information.

A node uses the active public key (the network active public key) to encrypt or sign messages destined for the key server or a third party. When the active private key has been compromised or is at risk of calculation, the key server sends out a key replacement message containing the replacement key and the hash of its own replacement key, replaces the active private key from the replacement private key storage and places the next replacement private key into the replacement private key storage. As should be apparent, according to this chain of succession, each new key (public or private) is first a next replacement key, then a replacement key, then an active key, then finally it is discarded. At the node, the active public key is replaced with the replacement public key and the hash of the replacement public key is replaced with the hash of the next replacement public key.

The key replacement message is signed by the active private key and the replacement private key. Because the message is signed by the replacement private key, it could ordinarily come from an entity with knowledge of the replacement private key before the message was sent.

If brute force computation of the active public/private key pair becomes feasible, that pair is deemed compromised, and the key replacement process is performed. Because only the hash of the replacement public key is available to an attacker, increasing computing power does not weaken the replacement public key as fast as the active public key, since many more operations are needed to determine the replacement public key and to then compute the replacement public key. Thus, supplying only the hash of the replacement public key until it is needed at the active public key helps ensure that the replacement key cannot be computationally determined with the same order of magnitude of computing power required to computationally determine the active public key.

In an alternate embodiment of the invention, the replacement public key is encrypted instead of using the hash of the replacement public key. When the active private key has been compromised or is at risk of calculation, the key server sends out a key replacement message containing the replacement key and the encrypted next replacement key, replaces the active private key from the replacement private key storage and places the encrypted next replacement private key into the replacement private key storage. The key replacement message also contains the key for decrypting the replacement public key and the message is signed by the active private key and the replacement private key. Because the message is signed by the replacement private key, it could only come from an entity with knowledge of the replacement private key before the message was sent. The decryption used on the encrypted next replacement key need not be the same as that used on the encrypted replacement key.

In a specific embodiment, multiple nodes of an insecure network are defined by the interconnected computers (personal computers, workstations, etc.) configured with the ability to send messages from one node to another or from one node to many nodes. At each node, memory is maintained with the active public key, the mask of the replacement public key, and the node's specific private/public key pair. Typically, a node is associated with one user, such as an individual using the node to send messages to other users at other nodes. For example, a node could be a personal computer connected to the Internet and the messages could be financial transactions transmitted by the user to banks and/or merchants.

In an alternate specific embodiment, the key user uses a smart card to store the active public key and the mask of the replacement public key, the key server is a financial institution and the message sent between the key user and the key server are financial transactions. In yet another embodiment, user specific data is stored on a card held by the user and the card is inserted or read by a publicly available terminal to form the node system.

In other embodiments, a node maintains multiple sets of active and masks of replacement public keys, one from each of a plurality of master nodes. This allows for independent secure communications with different master nodes.

A further understanding of the nature and advantages of the inventions herein may be realized by reference to the remaining portions of the specifications and the attached drawings.

DETAILED DESCRIPTION OF THE PREFERRED EMBODIMENTS

A system for key replacement in a public key cryptography system is described. In the following description numerous specific details, such as key length, encryption algorithm, etc., are set forth in detail in order to provide a more thorough description of the present invention. It will be apparent, however, to one skilled in the art, that the present invention may be practiced without these specific details. In other instances, well known features have not been described in detail so as not to unnecessarily obscure the present invention.

Figure 1:
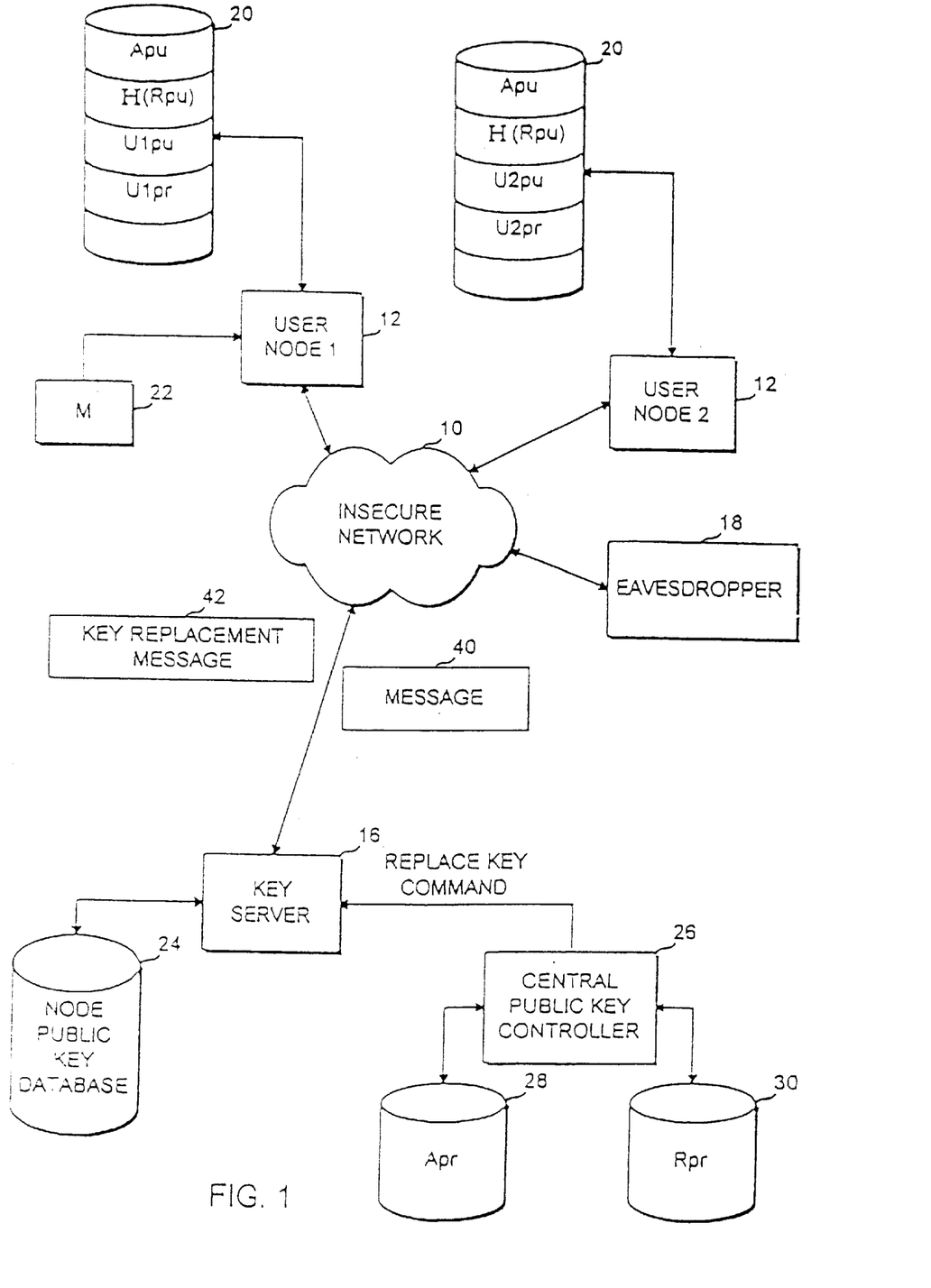
FIG. 1 is a block diagram of a network in which the present invention is used.

FIG. 1 is a block diagram of a network 10 which connects two nodes 12 (user node 1 and user node 2) to each other and to a key server 16. Although only two nodes are shown for clarity, it should be apparent that many more nodes are possible. As should also be apparent, network 10 need not be actually insecure, but is assumed to be so. An insecure network is a network where the possibility exists that an eavesdropper 18 is listening to network traffic.

Each node 12 is shown coupled to its own data key storage 20. User node 1 is shown with a message block 22 containing a message intended for delivery over network 10 to user node 2. Data key storage 20 contains storage for the active public key, a masked version of the replacement public key (here the hash of the replacement public key) and the user node's private/public key pair. Typically, the nodes are associated with individuals and organizations who are network users and operate and control their respective nodes, to send messages as desired, read received messages, change the user node key pair and publish the user node public key.

In the present invention, the hash of the replacement public key may be generated using any of several well known algorithms such as the MD5 algorithm or the SHA 1 algorithm or any other suitable hashing algorithm.

The following notation is used herein: "A" refers to the active key pair, with "Apu" being the active public key and "Apr" being the active private key. Likewise, the replacement key pair is "R", with "Rpu" being the replacement public key and "Rpr" being the replacement private key. The hash of a message M using a key K is written as H(M).

The user key pair is denoted by "U", with the public and private keys being "Upu" and "Upr" respectively. A user key pair is distinguished from the active key pair and the replacement key pair in that the latter two pairs are used system wide, while a user key pair is generated and maintained by the user of a specific node.

Often, to ensure that the contents of a message have not been altered and to verify the node from which a message was sent, the message is "digitally signed". To digitally sign a message, a node generates a digital signature block from the message contents and the node's private key as is known in the art. The digital signature block is then attached to the message. Because of the way the digital signature block is generated, it would be extremely difficult to determine a digital signature block for a message without knowing the private key used, and the digital signature blocks for the original message and an altered version of that message are unlikely to be the same. In a digital signature system, the recipient can apply the message, the digital signature block and the sender's public key to a signature verifier. The signature verifier reports whether or not that message was the exact message used to generate the digital signature. Herein, a message with a digital signature is denoted as (M)[K], where M is the message and [K] is the digital signature generated for message M using key K.

In the example described below, only one master node is used and the operator of that node controls key server 16 and thus controls, or "owns", the active public/private key pair and the replacement public/private key pair. Thus, the operator of key server 16 knows, and keeps secret, the active private key and the replacement private key. In some systems, the active and replacement key pairs are referred to as "system key pairs" to distinguish them from user key pairs.

In FIG. 1, key server 16 is shown coupled to a key server public key database 24 for holding the public keys of each participating node. Key server 16 is also shown coupled to receive "replace key" commands from a central public key controller 26, which is in turn coupled to storage 28 for the active private key (Apr) and storage 30 for the replacement private key (Rpr). Key server 16 sends messages, such as message 40 and key replacement message 42 to nodes 12 over network 10. In a preferred embodiment, storage 28 and storage 30 are not located in the same physical location or secured by a common security method, so that a single breach of security which allows access to one key will not allow access to the other key.

It is assumed that eavesdropper 18 has the capability to send messages which appear to be sent by a node other than itself, such as node 12 or key server 16. With this capability, eavesdropper 18 might send a key replacement message to user node 1 falsely indicating that the message was sent by key server 16. This forged message would instruct user node 1 to update Apu to a value provided (apparently) by key server 16. If eavesdropper 18 sends a false Apu value which is paired with a private key known to eavesdropper 18, and if user node 1 accepts the message as authentic and changes Apu, eavesdropper 18 will be able to decrypt all subsequent messages encrypted with the false Apu. Eavesdropper 18 could also send key server 16 a message apparently from user node 1 where the message indicates that user node 1 has changed its user public key, U1pu, to a public key which is paired with a private key known by eavesdropper 18. If accepted by key server 16, eavesdropper 18 would then be able to decrypt any messages from key server 16 which are encrypted with U1pu.

In operation, of course, user nodes 12 and key server 16 are more cautious. To securely send a message from one node to another, the sender must obtain the recipient's real public key and use that key to encrypt the message. To know the real key for the recipient, the sender must have some way of assuring that the public key for the recipient is correct The public keys for specific nodes are obtained by querying key server 16, which supplies the public keys from node key database 24. These public keys are the keys published by the user nodes.

Since network 10 is deemed insecure, it is assumed that if user node 1 requests a public key from user node 2, eavesdropper 18 could stand in place of user node 2, intercept the request, reply with a key known to eavesdropper 18, intercept the message and decrypt the message. To prevent this scenario, the user nodes supply their public keys to key server 16 using a message which could not have been sent from eavesdropper 18 and which is not readable by eavesdropper 18. To do this, key server 16 needs to engage in one initial secure interaction with each node, to get the node's public key and be assured that it was sent from that node. Fortunately, this is easily done during the set-up of a node. For example, if the node is a personal computer, a distribution diskette could contain an initial user key pair or the key pair could be distributed over the telephone. If each message from a node to key server 16 is digitally signed with the node's private key, key server 16 is assured that it was not sent by eavesdropper 18. If the message is also encrypted with the active public key, eavesdropper 18 cannot read the message. If one user compromises the private key of its node, the security breach is confined to that user's node and is easily remedied by sending a new key over a secure channel to that node (e.g., sending a new smart card to the user of the node). However, if the active public key is compromised, without more, each node in the entire system would have to be reinitialized with the replacement public key over secure channels. The secure channel is not needed with the present invention where only the active key is compromised, whether it be by authorized access to storage 28 or by computational brute force.

Key server 16 accepts key replacement commands from central public key controller 26, which decides when to replace the active public key, Apu. Central public key controller 26 generates a new replacement key pair each time the active key is to be replaced with the existing replacement key, and updates storage 28 and 30 accordingly. Herein the new key pair is referred to as (R1pu, R1pr), and subsequently generated new pairs are (R2pu, R2pr), (R3pu, R3pr), etc. The process of secure replacement of the public key over an insecure network is shown in FIG. 2.

Figure 2:
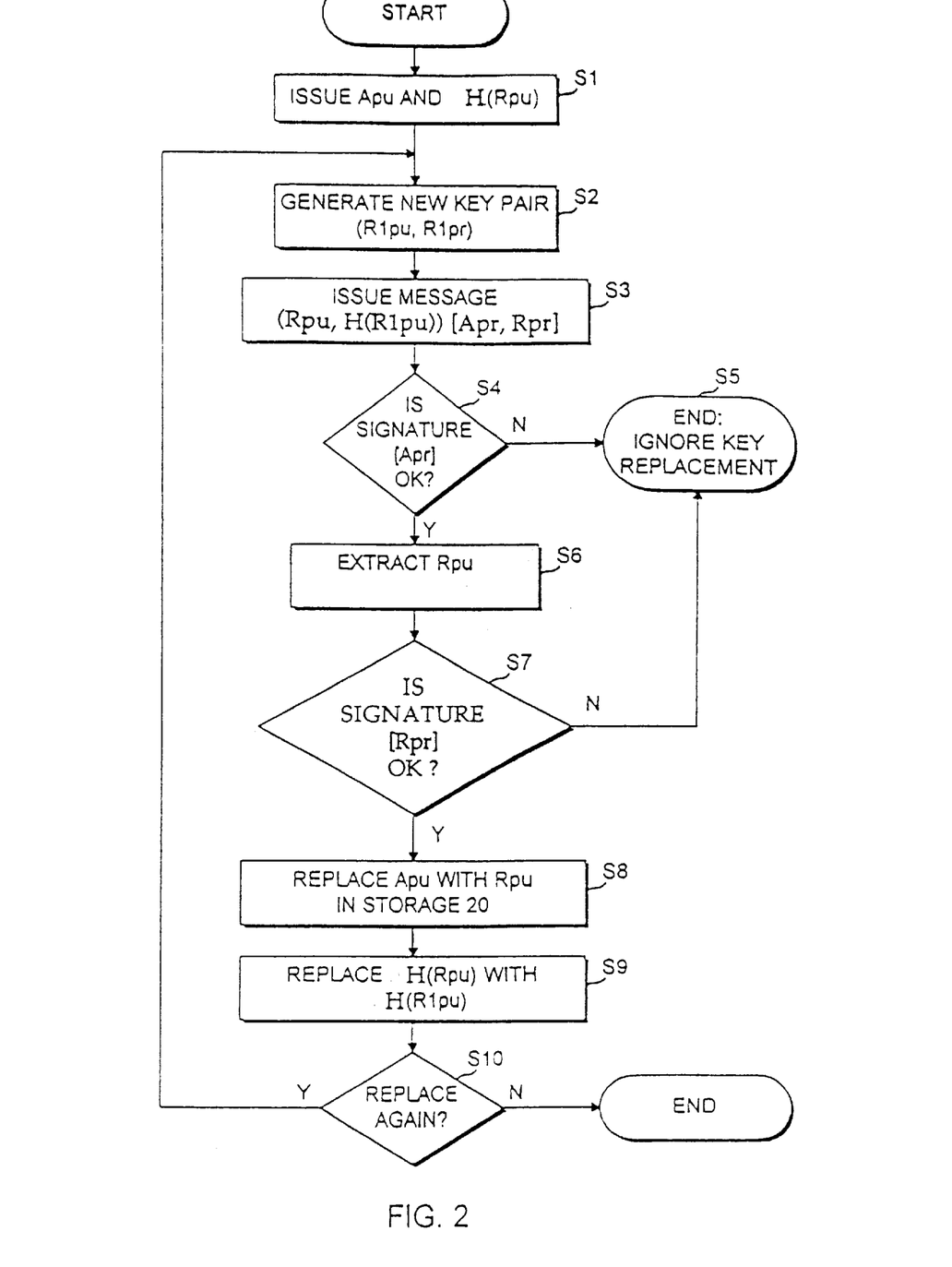
FIG. 2 is a flow chart of a process of replacing a key in a secure manner.

FIG. 2 is a flow chart of a process for publishing a public key and for replacing a public key when its paired private key is compromised or insufficiently secure. In the example shown, the public key being replaced is Apu, the active public key of key server 16. The active public key might not be actually compromised, as key replacement might be called for as technology advances to the point where it is conceivable that Apu could be calculated by brute force, in which case the replacement key would be a longer or more complex key. Alternatively, key replacement could occur on a regular, periodic basis, since a secure channel is not needed. The process of key replacement must occur both at key server 16 and at nodes 12, since keys are paired. Thus, when the private key is replaced in storage 28, that replaced key cannot be used unless the public key stored in data storage 20 is also replaced.

Figure 4:
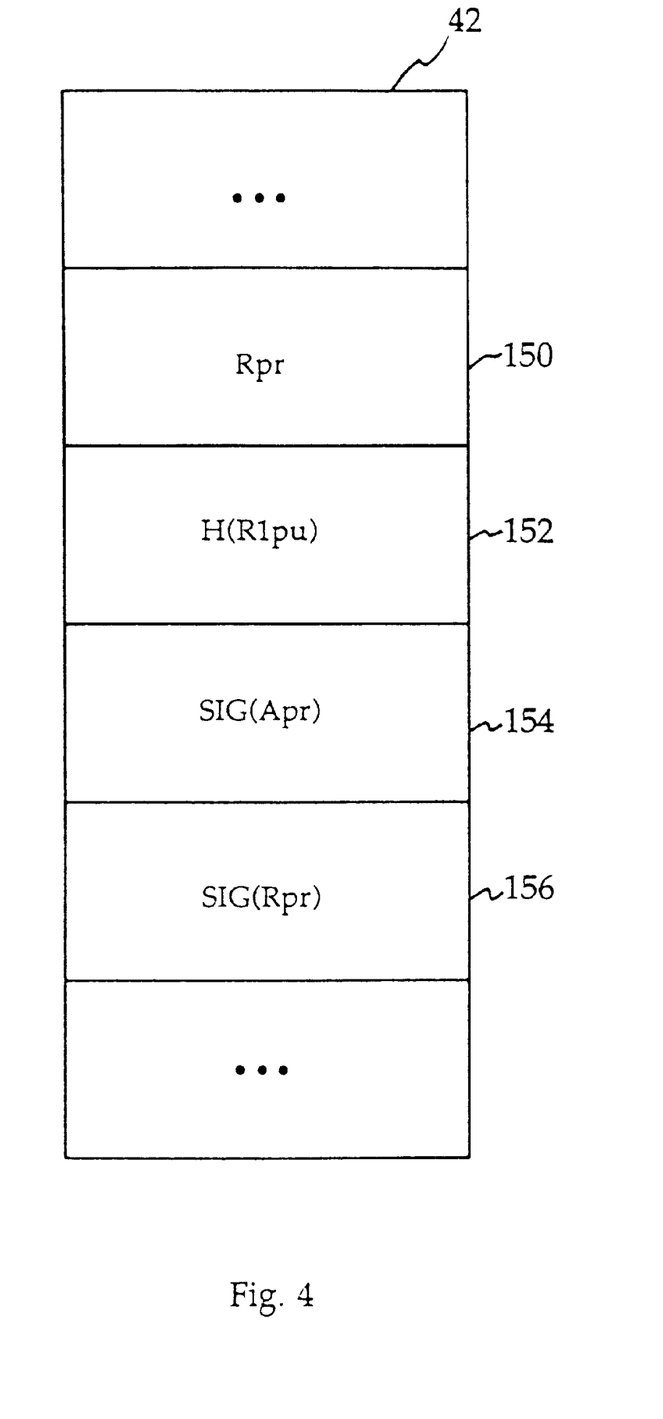
FIG. 4 is a schematic diagram of a portion of a key replacement message.

Referring again to FIG. 2, the steps of the process shown there are labeled S1, S2, S3, etc., for ease of reference. In step S1, Apu and H(Rpu) are supplied initially to each node over a secure channel. As explained above, this step need only be done once. The key replacement process begins with step S2, where a new key pair (R1pu, R1pr) is generated). This is done by either key server 16 or central public key controller 26. In step S3, key server 16 sends a key replacement message (such as key replacement message 42 shown in FIG. 1 and in detail in FIG. 4) to each node 12, or broadcasts a single key replacement message. A number of fields of key replacement message 42 are shown in FIG. 4. These fields include the replacement public key 150, the hash of the next replacement public key 152, and digital signatures for the message 154, 156.

The entire key replacement message is digitally signed by both the active private key, Apr, and the private replacement key, Rpr. Additionally, the message might be encrypted using the active public key, Apu. However, given that Apu might have been compromised, a more secure method is to send separate messages to each node, each encrypted with the node's public key. If the key replacement message is encrypted, it is decrypted by the node.

FIG. 4 shows key replacement message 42 in greater detail. This message 42 is sent from key server 16 to node 12 as part of the key replacement process. The fields shown are Rpr, H(R1pu), SIG (Apr) and SIG(Rpr).

The key replacement process has the following steps: 1) a new key pair is generated by central public key controller 26, 2) central public key controller 26 moves the existing replacement private key from storage 30 to storage 28, making it the new active private key, 3) central public key controller 26 moves the next replacement private key to storage 30, making it the new replacement private key, 4) central public key controller 26 sends a key replacement command to key server 16, where the key replacement command includes the replacement public key and the hash of the public key from the next replacement key pair, and 5) the next replacement public key is inserted into message 42 as field H(R1pu). This example is for the first generation of key replacement. In the second generation, the field is designated H(R2pu), to be consistent with the conventions used here. Because the keys are paired, these steps must be done together, otherwise messages might be encrypted with one generation of keys and decryption would be attempted with a different generation of keys.

The field Rpu contains the replacement key.

The field H(R1pu) is generated by hashing the next replacement public key, now designated R1pu, according to the hashing function H(). The hashing of R1pu can be performed either by central public key controller 26 of key server 16.

The fields SIG(Apr) and SIG(Rpr) are digital signatures, also sometimes referred to as [Apr] and [Rpr], respectively. The digital signature SIG(Apr) is a signature of message 42 using the currently active private key, i.e., the contents of storage 28 before the replacement is done. This digital signature is verified by applying message 42 and the other key which is paired with the signing key Apr, namely active public key Apu, to a verifier. Similarly, the digital signature SIG(Rpr) is verified by applying message 42 and the replacement public key, Rpu, to the verifier.

If both digital signatures verify message 42, the node replaces H(Rpu) with H(R1pu) and replaces Apu with Rpu. In this way, the active public key stored in storage 20 is replaced with the replacement public key, which was also stored in storage 20, and the hash of the next replacement public key extracted from message 42 is stored in storage 20 as the hash of the replacement public key.

Referring again to FIG. 2, in step S4, the digital signature [Apr] is verified using Apu. If the digital signature does not match the message and the active public key (Apu), then the key replacement message is ignored (S5). In some embodiments, the node will send a message to key server 16 to the effect that an unauthorized key replacement message has apparently been sent.

If the digital signature [Apr] is verified, the replacement public key, Rpu, is extracted from the key replacement message (S6)

The replacement public key, Rpu, is used to verify the digital signature [Rpr] of the key replacement message (S7). If the digital signature [Rpr] does not verify, the process flows to step S5, otherwise it continues to step S8. In step S8, the node replaces Apu in storage 20 with the replacement public key, Rpu and replaces H(Rpu) in storage 20 with the hash of the next replacement public key, H(R1pu) (S9).

At this point, key replacement is complete. If desired, the process can be repeated (S10) so that yet another new key pair (R2pu, R2pr) is generated, where R2pu becomes the replacement key with R1pu being the active key. Performing the process twice is useful where both the active key and the replacement key are nearing obsolescence. If the replacement key is never generally available, i.e., only its hash is generally available, any computation to break the keys will take longer to break the replacement key than the active key, since the replacement public key must be broken before the replacement private key can be attacked.

If the replacement private key is physically compromised, but the active private key is not, this method will still securely transmit the key replacement message over the insecure network, since it is signed by the active private key. Of course, in this situation, the key replacement would be done twice in quick succession, in order to retire the compromised replacement key.

Figure 5:
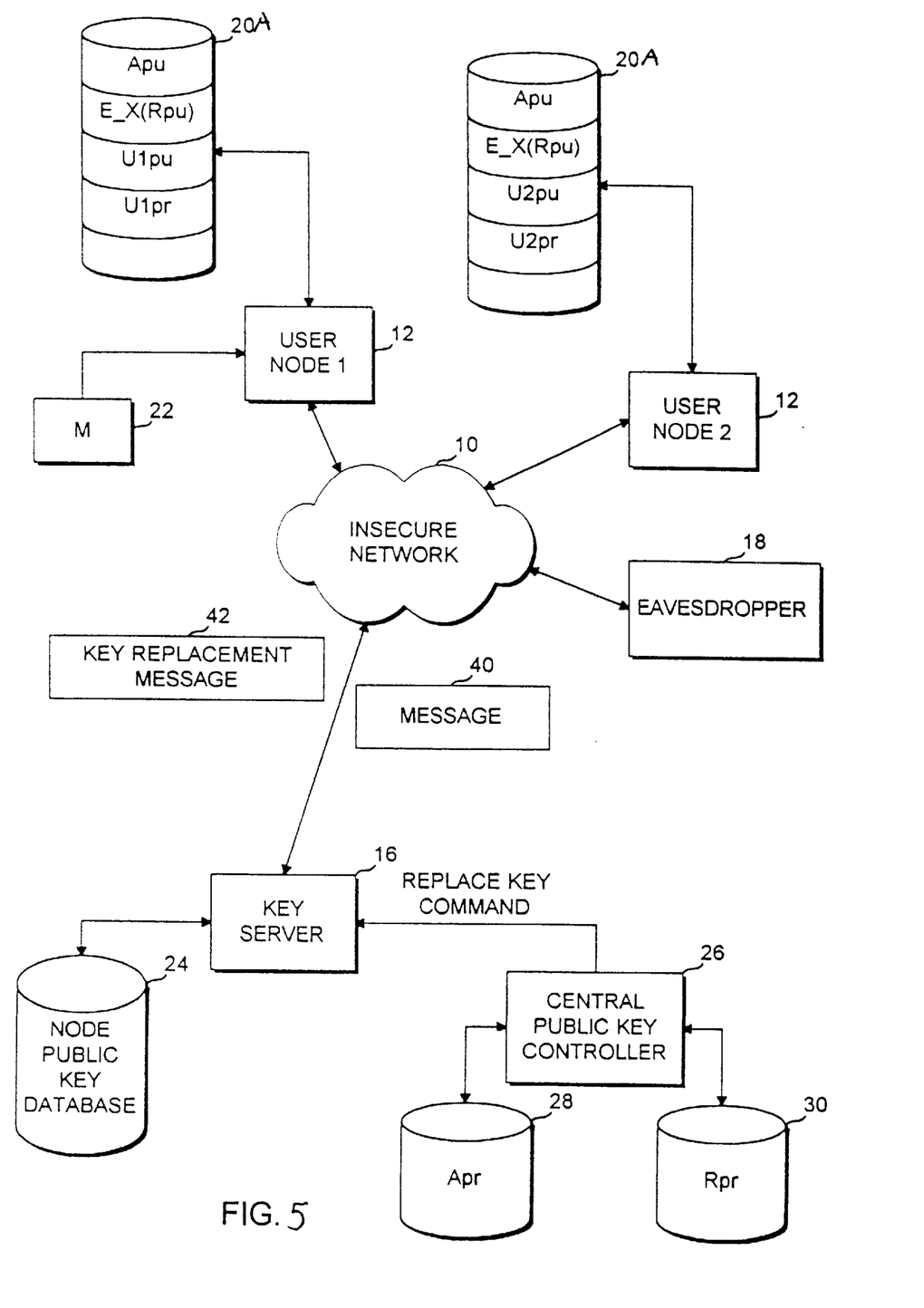
FIG. 5 is a block diagram of a network in which an alternate embodiment of the present invention is used.

In an alternate embodiment, the masking of the replacement public key can be accomplished by encrypting it. FIG. 5 illustrates a system similar to the system in FIG. 1. Like elements have been given like numerals in FIGS. 1 and 5. One difference in FIG. 5 is that in data key storage 20A, the encrypted replacement public key is stored instead of the hash of the replacement public key.

The following notation is used in connection with FIG. 5: "A" refers to the active key pair, with "Apu" being the active public key and "Apr" being the active private key. Likewise, the replacement key pair is "R", with "Rpu" being the replacement public key and "Rpr" being the replacement private key. Encryption of a message M using a key K is written as E_K(M), while decryption of the encrypted message E_K(M) using key K is written as D_K(E_K(M)). This notation refers to both secret key encryption and public key encryption, although when referring only to public key encryption, the more specific notation E_Kpu (M) and D_Kpr (M) is used to clearly indicate the different components of the key or key pairs are used for encryption and decryption. The functions E_K() and D_K() need not be distinct. For example, where encryption is the exclusive OR'ing of the message and the key, E_K() and D_K() are the same functions.

Figure 6:
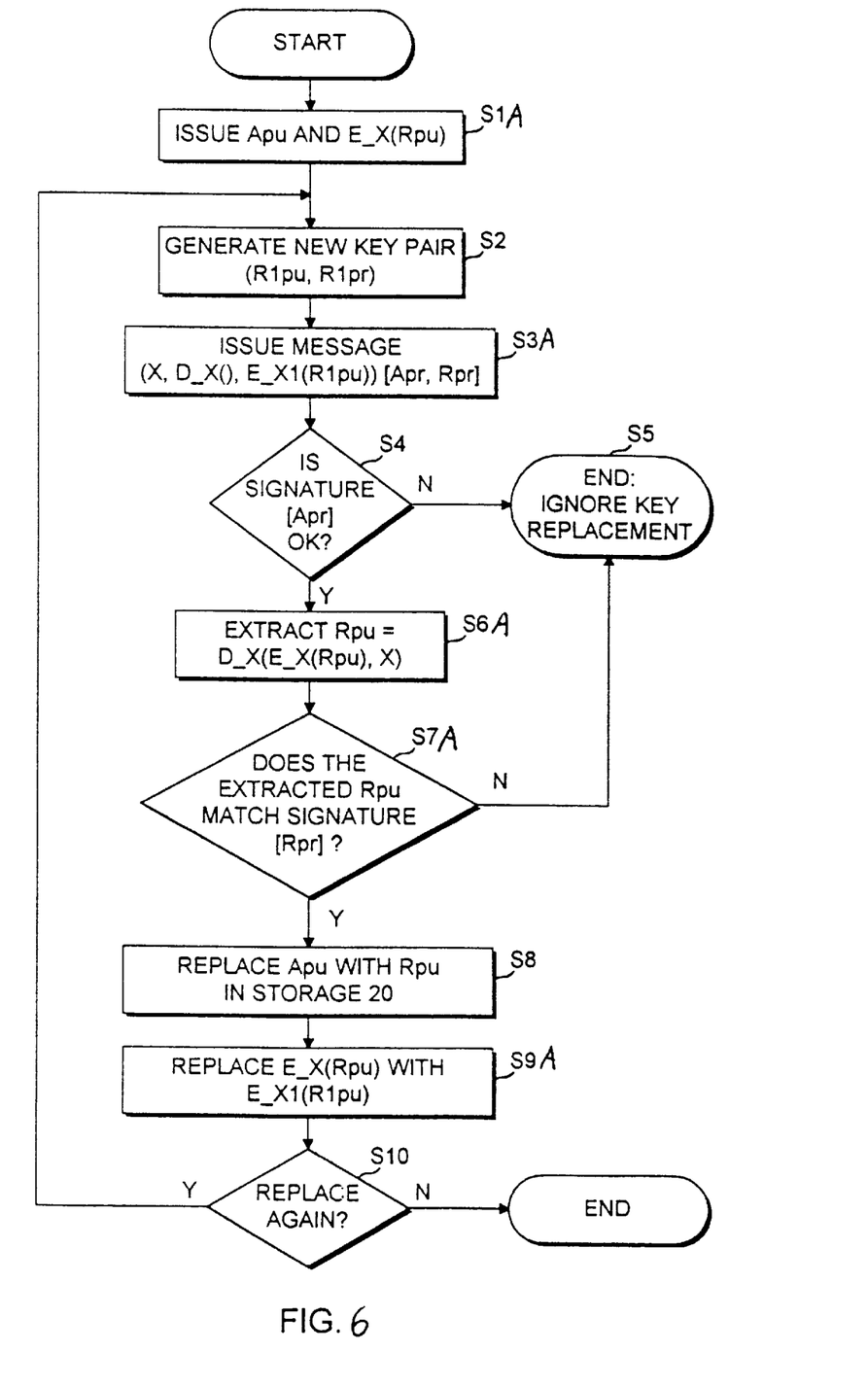
FIG. 6 is a flow chart of a process of replacing a key in a secure manner in an alternate embodiment of the invention.

FIG. 6 is a flow chart similar to FIG. 2 but showing a process using encryption for publishing a public key and for replacing a public key when its paired private key is compromised or insufficiently secure. In FIGS. 2 and 6, like elements have like numbers. In the example shown, the public key being replaced is Apu, the active public key of key server 16. The active public key might not be actually compromised, as key replacement might be called for as technology advances to the point where it is conceivable that Apu could be calculated by brute force, in which case the replacement key would be a longer or more complex key. Alternatively, key replacement could occur on a regular, periodic basis, since a secure channel is not needed. The process of key replacement must occur both at key server 16 and at nodes 12, since keys are paired. Thus, when the private key is replaced in storage 28, that replaced key cannot be used unless the public key stored in data storage 20A is also replaced.

Figure 7:
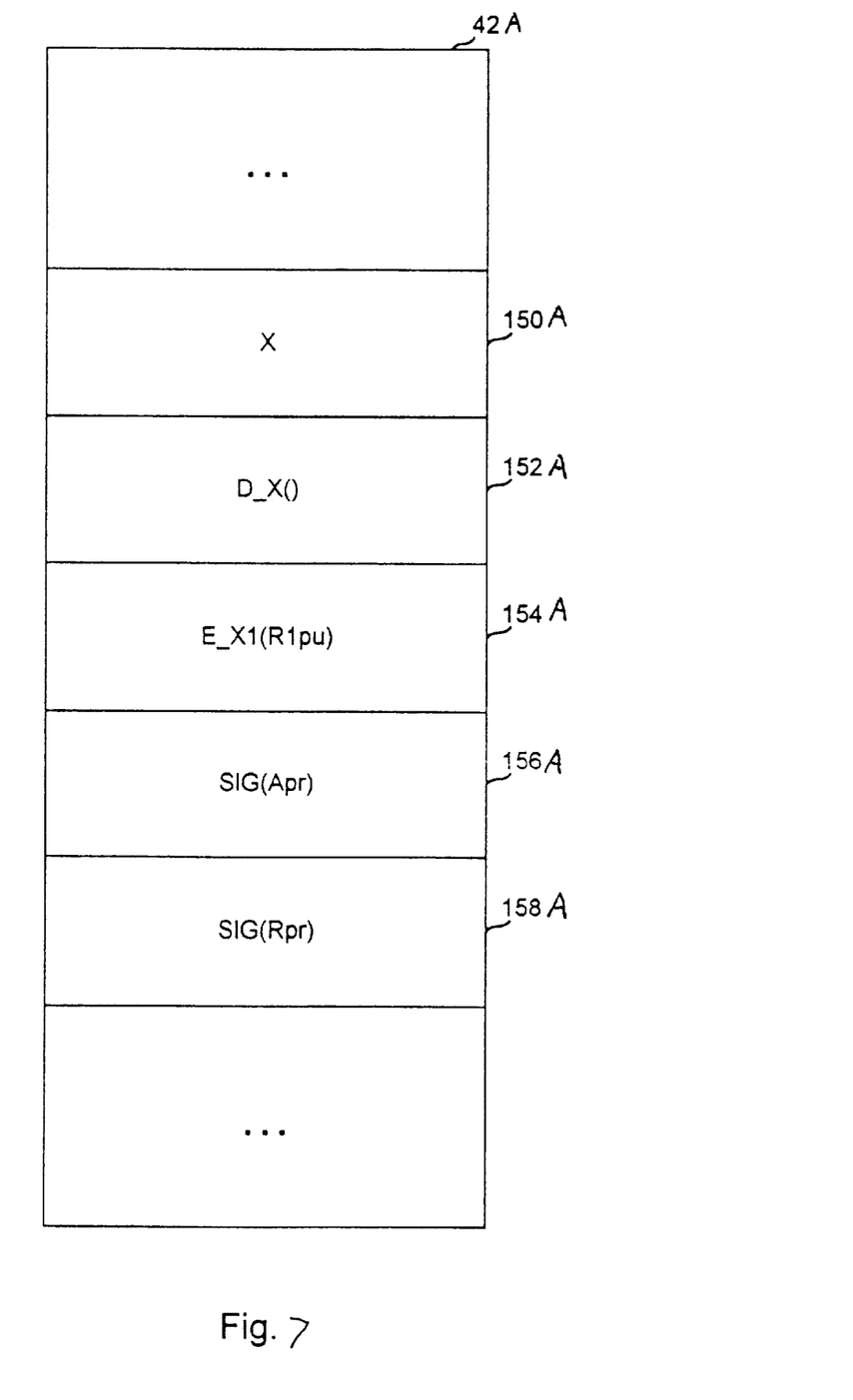
FIG. 7 is a schematic diagram of a portion of a key replacement message in an alternate embodiment of the invention

Referring again to FIG. 6, the steps of the process shown there are labeled S1A, S2, S3A, etc., for ease of reference. In step S1A, Apu and E_X(Rpu) are supplied initially to each node over a secure channel. As explained above, this step need only be done once. The key replacement process begins with step S2, where a new key pair (R1pu, R1pr) is generated. This is done by either key server 16 or central public key controller 26. In step S3A, key server 16 sends a key replacement message (such as key replacement message 42 shown in FIG. 5 and in detail in FIG. 7) to each node 12, or broadcasts a single key replacement message. A number of fields of key replacement message 42 are shown in FIG. 7. These fields include the next replacement public key 150A, data necessary to decode the replacement public key 152A, 154A, and digital signatures for the message 156A, 158A.

The entire key replacement message is digitally signed by both the active private key, Apr, and the private replacement key, Rpr. Additionally, the message might be encrypted using the active public key, Apu. However, given that Apu might have been compromised, a more secure method is to send separate messages to each node, each encrypted with the node's public key. If the key replacement message is encrypted, it is decrypted by the node.

FIG. 7 shows key replacement message 42 in greater detail. This message 42A is sent from key server 16 to node 12 as part of the key replacement process. The fields shown are X, D_X(), E_X1(R1pu), SIG (Apr) and SIG(Rpr). These fields will be described in further detail below.

The key replacement process has the following steps: 1) a new key pair is generated by central public key controller 26, 2) central public key controller 26 moves the existing replacement private key from storage 30 to storage 28, making it the new active private key, 3) central public key controller 26 moves the next replacement private key to storage 30, making it the new replacement private key, 4) central public key controller 26 sends a key replacement command to key server 16, where the key replacement command includes the new public key from the next replacement key pair, and 5) the next replacement public key is inserted into message 42 as field E_X1(R1pu). This example is for the first generation of key replacement. In the second generation, the field is designated E_X2(R2pu), to be consistent with the conventions used here. Because the keys are paired, these steps must be done together, otherwise messages might be encrypted with one generation of keys and decryption would be attempted with a different generation of keys.

The field X contains the decryption key for E_X(Rpu), the encrypted replacement key which resides at the node to which message 42 is sent. The field D_X() contains the decryption method for E_X(Rpu). In some embodiments, D_X() is known ahead of time as the user node, so this field is not needed. This field contains, depending on implementation, parameters and/or program instructions for the decoding process. With the X and D_X() fields, the node can decrypt the replacement public key.

The field E_X1(R1pu) is generated by encrypting the next replacement public key, now designated R1pu, according to the encryption function E_X1(). The encryption of R1pu can be performed either by central public key controller 26 of key server 16.

The fields SIG(Apr) and SIG(Rpr) are digital signatures, also sometimes referred to as [Apr] and [Rpr], respectively. The digital signature SIG(Apr) is a signature of message 42 using the currently active private key, i.e., the contents of storage 28 before the replacement is done. This digital signature is verified by applying message 42 and the other key which is paired with the signing key Apr, namely active public key Apu, to a verifier. Similarly, the digital signature SIG(Rpr) is verified by applying message 42 and the replacement public key, Rpu, to the verifier. Of course, the replacement public key, Rpu, must be decrypted before it can be applied to the verifier.

If both digital signatures verify message 42, the node replaces E_X(Rpu) with E_X1(R1pu) and replaces Apu with Rpu. In this way, the active public key stored in storage 20A is replaced with the replacement public key, which was also stored in storage 20A, and the replacement replacement public key extracted from message 42 is stored in storage 20A as the replacement public key. Of course the next replacement public key is encrypted and stored in its encrypted form, until the next generation when it is needed as the active public key.

Referring again to FIG. 6, in step S4, the digital signature [Apr] is verified using Apu. If the digital signature does not match the message and the active public key (Apu), then the key replacement message is ignored (S5). In some embodiments, the node will send a message to key server 16 to the effect that an unauthorized key replacement message has apparently been sent.

If the digital signature [Apr] is verified, the replacement public key, Rpu, is extracted from the key replacement message (S6A), using the key and decryption method provided by the key replacement message.

Once the replacement public key, Rpu, is decrypted, it can be used to verify the digital signature [Rpr] of the key replacement message (S7A). If the digital signature [Rpr]

does not verify, the process flows to step S5, otherwise it continues to step S8. In step S8, the node replaces Apu in storage 20A with the replacement public key, Rpu and replaces E__X(Rpu) in storage 20A with the encrypted next replacement public key, E__X1(R1pu) (S9A).

At this point, key replacement is complete. If desired, the process can be repeated (S10) so that yet another new key pair (R2pu, R2pr) is generated, where R2pu becomes the replacement key with R1pu being the active key. Performing the process twice is useful where both the active key and the replacement key are nearing obsolescence. If the replacement key is only ever generally available in encrypted form, any computation to break the keys will take longer to break the replacement key than the active key, since the encryption on the replacement public key must first be broken before the replacement private key can be attacked.

If the replacement private key is physically compromised, but the active private key is not, this method will still securely transmit the key replacement message over the insecure network, since it is signed by the active private key. Of course, in this situation, the key replacement would be done twice in quick succession, in order to retire the compromised replacement key.

Figure 3:
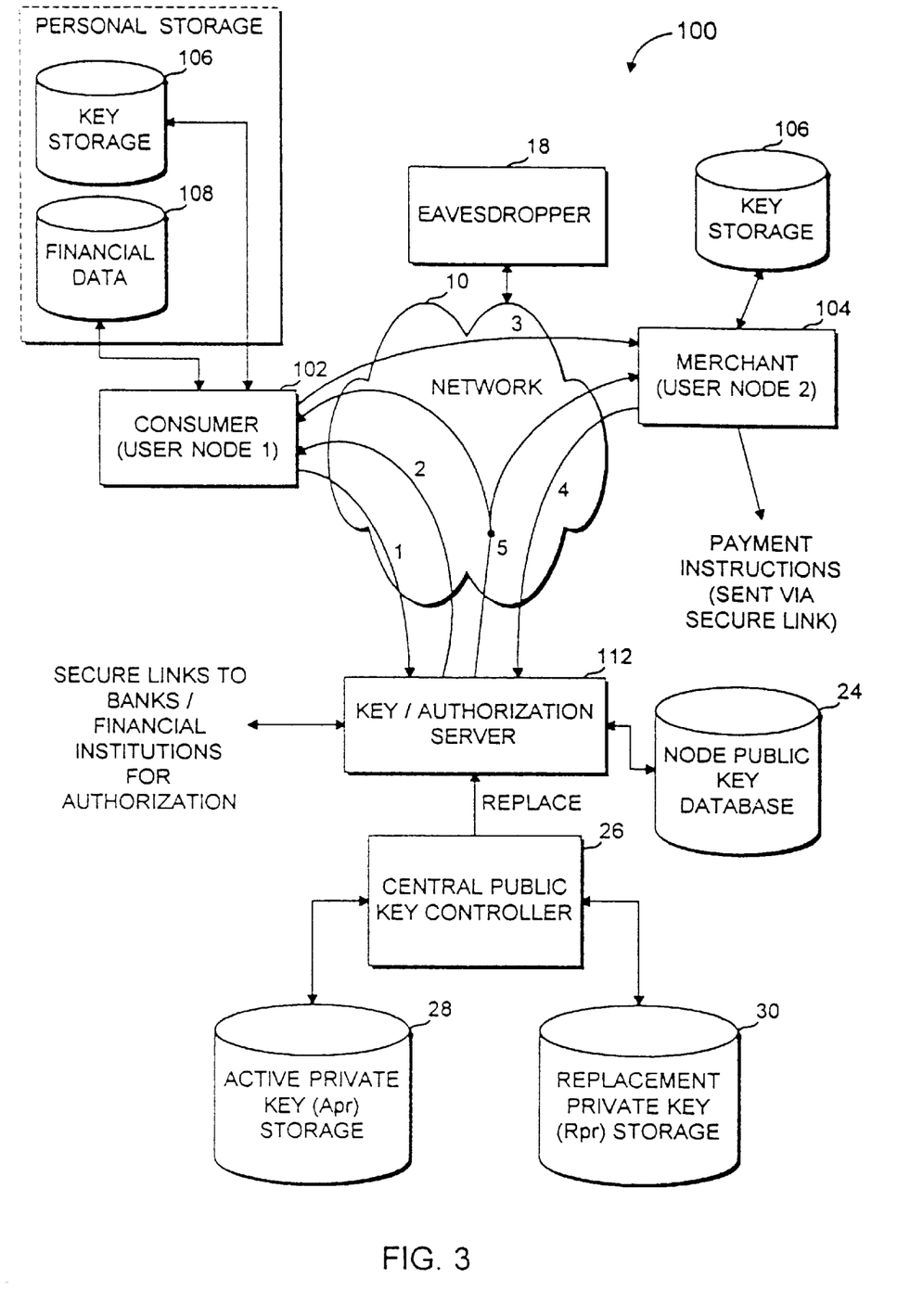
FIG. 3 is a block diagram of a specific application wherein the network is used to carry secure traffic between consumers and merchants.

FIG. 3 shows a specific application of the key replacement system, a financial transaction system 100. Several elements of FIG. 1 are shown again in FIG. 3: network 10, eavesdropper 18, node public key database 24, central public key controller 26, and storage 28 and 30. System 100 is used to facilitate a secure transaction, such as a credit or debit card transaction between a consumer at a consumer node 102 and a merchant at a merchant node 104 via network 10. Consumer node 102 is implemented as a personal computer, a smart card, or a publicly accessible terminal. If consumer node 102 is a publicly accessible terminal, such as an ATM, kiosk or point-of-sale (POS) terminal, data personal to the consumer would be stored separately (labeled "personal storage 110" in the figure), and would include key storage 106 similar to key storage 20 shown in FIG. 1 or 20A of FIG. 5 and a financial database 108, each coupled to consumer node 102. Key storage 106 coupled to the consumer node 102 stores the central public keys and the consumer's keys, public and private, as well as other consumer specific data. Merchant node 104 also is coupled to its own key storage 106, which stores the central public keys and merchant keys. If a node 12 is both a consumer and a merchant node, it might use the same keys for both buying and selling transactions.

A key server 112 is coupled to network 10 and central public controller 26. Key server 112 serves the same purpose as key server 16 of FIG. 1, as well as an additional purpose of being an authorization server which uses secure links to a financial network to secure authorization and/or funds for transactions entered into by a consumer at consumer node 102.

A transaction is shown in FIG. 3 by paths numbered 1 through 5. A consumer initiates the transaction. For example, a consumer might browse publicly available files of offerings of a merchant, such as World Wide Web pages on the Internet and decide to order a product. To pay for the product, the consumer sends a secure message to the merchant. To do this, consumer node 102 sends a public key request message to key server 112 (path 1). Key server then responds with a public key value message back to consumer node 102 indicating the public key for merchant node 104 (path 2). These two messages are sent secured by the methods described above. The message to key server 112 and its response are encrypted and/or signed using the public and private keys of key server 112, so those keys must be kept especially secure.

The consumer node 102 then sends the transaction data to merchant node 104 in a message encrypted with the public key for merchant nod 104 and signed by the private key for consumer node 102. For example, the message might say "charge item #123, quantity 1, to card number 47##-####-####-####, expiration date mm/yy". This message is decryptable only by the merchant node, since the merchant node private key is required for decryption. Merchant node 104 uses this information to process the payment over the secure financial network. The merchant can verify the signature on the transaction using the consumer's public key, which can be obtained from key server 112.

Before submitting the payment over the financial network, merchant node 104 can check card authorization either through the financial network or through key server 112 (via path 4), which would then check for authorization and secure funds. Key server 112 then (path 5) securely reports the results of the authorization to consumer node 102 as well as merchant node 104.

As should be apparent, the above-described method and apparatus might also be used to perform bill payment or the secure network might be entirely replaced by network 10, in which case issuer banks (who issue credit, debit or bank cards to consumers), acquirer banks (who acquire transactions from merchants), and settlement systems could be nodes on network 10. Bill payment might be performed as taught by U.S. Pat. No. 5,465,206 (Appl. Ser. No.: 08/146, 515), issued to Hilt, et al. on Nov. 7, 1995, and commonly owned with the present application. That patent is incorporated by reference herein.

In summary, the above detailed description has described a method and apparatus for securely distributing keys over an insecure network from a central source, to allow secure communications between nodes and a key server and from nodes to nodes, even where each node has no means to verify the identity of any other node except the key server. The keys that are distributed are the network public keys.

The above description is illustrative and not restrictive. Many variations of the invention will become apparent to those of skill in the art upon review of this disclosure. Merely by way of example, the apparatus might be implemented wholly in general purpose computers suitably programmed or could be implemented by special purpose hardware or integrated circuitry. Also, the above description shows the application of key replacement to the public key of a network, i.e., the master node's public key. However, the same key replacement methods and apparatus could also be used for more secure replacement of user node keys. In such a system, the key server would maintain user public keys and replacement user public keys.

The scope of the invention should, therefore, be determined not with reference to the above description, but instead should be determined with reference to the appended claims along with their full scope of equivalents.

What is claimed is:

1. A public key cryptography apparatus for secure communications over an untrusted network between a key server node and a user node, comprising:

user data storage, coupled to the user node of the untrusted network, for storing a first active public key and a first replacement public key;

key server data storage, coupled to the key server node, for storing a first active private key and a first replacement private key, wherein the first active private key and the first active public key are a first key pair and the first replacement private key and the first replacement public key are a first replacement key pair;

means for transmitting a key replacement message from the key server node to the user node, the key replacement message comprising the first replacement public key, a mask of a second replacement public key and a digital signature proving knowledge by the key server node of both of the first active private key and the first replacement private key; and means for using the second replacement public key to replace the first replacement public key and using the first replacement public key as a second active public key wherein the second active public key is used to encrypt or decrypt data in conjunction with a corresponding second active private key.

2. The public key cryptography apparatus of claim 1 wherein the mask of the first replacement public key is a hash of the first replacement public key.

3. The public key cryptograph apparatus of claim 2 wherein the hash is generated using the MD5 hashing algorithm.

4. The public key cryptography apparatus of claim 2 wherein the hash is generated using the SHA 1 hashing algorithm.

5. The public key cryptography apparatus of claim 1 wherein the mask of the first replacement public key is generated by encrypting the first replacement public key.

6. A key replacement system comprising:

plurality of user nodes, each coupled to send and receive messages over said network, each said user node having a user node storage device for storing at least an active public key, an indication of a replacement public key, and a user node key pair;

a key server, coupled to send and receive messages over a network, said key server coupled to at least a first storage device for storing user node public key information for said plurality of user nodes coupled to said network;

a key controller, coupled to said key server, including a key controller storage device for storing an active private key and a replacement private key, said active public key and said active private key comprising a key pair, said replacement public key and said replacement private key comprising a replacement key pair;

said key controller producing a key replacement message including said replacement public key, an indication of a next replacement public key, a first digital signature verifiable by said active public key, and a second digital signature verifiable by said replacement private key;

wherein said key replacement message is forwarded to said plurality of user nodes;

wherein the authenticity of said first digital signature and second digital signature are verified before the plurality of user nodes replace said active public key with said replacement public key, thereby defining a new active public key; and wherein the new active public key is used to encrypt or decrypt data sent over said network.

7. The key replacement system of claim 6, wherein said indication of said replacement public key is a mask of said replacement public key.

8. The key replacement system of claim 6, wherein said indication of said replacement public key is an encrypted version of said replacement public key.

9. The key replacement system of claim 7, wherein said mask of said replacement public key is generated by said key server.

10. The key replacement system of claim 7, wherein said mask of said replacement public key is generated by said key controller.

11. The key replacement system of claim 6, wherein said key server and said key controller are implemented on a common computer system.

12. A public key cryptography apparatus for secure communications over a network, comprising:

user data storage, coupled to a user node of said network, for storing an active public key and a replacement public key;

key server data storage, coupled to a key server node of said network, for storing an active private key and a replacement private key, wherein said active private key and said active public key are an active key pair and said replacement private key and said replacement public key are a replacement key pair;

said key server node transmitting a key replacement message from said key server node to said user node over said network, said key replacement message comprising said replacement public key, a mask of a next replacement public key and a digital signature proving knowledge by said key server node of both of said active private key and said replacement private key;

said user node receiving said key replacement message and replacing said active public key with said replacement public key if the authenticity of said digital signature is verified, wherein said replacement public key and replacement private key are used to encode data according to the Public Key Infrastructure for secure communications over a network.

13. The apparatus of claim 12, further comprising a plurality of user nodes coupled to said network, each of said user nodes receiving said key replacement message and replacing said active public key with said replacement public key if the authenticity of said digital signature is verified.

* * * * *